United States Patent
Knobloch (10) Patent No.: US 11,658,487 B2
(45) Date of Patent: May 23, 2023

(54) METHOD FOR PROVIDING CONTROL POWER FOR AN ALTERNATING VOLTAGE SYSTEM BY MEANS OF AN ENERGY-GENERATING PLANT

(71) Applicant: SMA Solar Technology AG, Niestetal (DE)

(72) Inventor: Andreas Knobloch, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 18 days.

(21) Appl. No.: 17/360,134

(22) Filed: Jun. 28, 2021

(65) Prior Publication Data

US 2021/0328434 A1 Oct. 21, 2021

Related U.S. Application Data

(63) Continuation of application No. PCT/EP2019/086378, filed on Dec. 19, 2019.

(30) Foreign Application Priority Data

Dec. 19, 2018 (DE) .................... 10 2018 133 707.8

(51) Int. Cl.
*H02J 3/32* (2006.01)
*H02J 3/38* (2006.01)
(Continued)

(52) U.S. Cl.
CPC ............... *H02J 3/32* (2013.01); *H02J 3/381* (2013.01); *H02J 3/466* (2020.01); *H02S 40/32* (2014.12); *H02J 2300/24* (2020.01)

(58) Field of Classification Search
CPC .... H02J 3/32; H02J 3/381; H02J 3/466; H02J 2300/24; H02J 3/241; H02J 3/38; H02S 40/32; Y02E 10/56; Y02E 70/30
See application file for complete search history.

(56) References Cited

U.S. PATENT DOCUMENTS

| 2014/0204613 A1* | 7/2014 | Blanz | H02S 40/00 363/13 |
| 2016/0141879 A1* | 5/2016 | Motsenbocker | G05F 1/67 307/130 |

(Continued)

FOREIGN PATENT DOCUMENTS

| CN | 107046290 | * | 8/2017 |
| DE | WO2013045072 | * | 4/2013 |

(Continued)

OTHER PUBLICATIONS

International Search Report dated Feb. 11, 2020 in connection with PCT/EP2019/086378.

*Primary Examiner* — Toan T Vu
(74) *Attorney, Agent, or Firm* — Eschweiler & Potashnik, LLC (57) ABSTRACT

An energy generation system provides balancing power for an AC voltage grid, and comprises a photovoltaic generator and an energy store, wherein the energy generation system exchanges a total electrical power with the AC voltage grid (1), wherein the total power exchanged is set as a function of a current maximum PV power, a predefinable basic PV power between zero and the maximum PV power and a provided or requested balancing power. When no balancing power is requested: a total basic power, which comprises the basic PV power can be fed in; When a negative balancing power is requested: the PV power can be reduced compared to the basic PV power; When a positive balancing power is requested: a battery power can be drawn from the energy store if the requested positive balancing power is greater than the difference between the maximum PV power and the basic PV power.

23 Claims, 5 Drawing Sheets

(51) Int. Cl.
   *H02J 3/46*     (2006.01)
   *H02S 40/32*    (2014.01)

(56) References Cited

U.S. PATENT DOCUMENTS

| | | | |
|---|---|---|---|
| 2017/0104336 A1* | 4/2017 | ElBsat | H02J 7/0068 |
| 2018/0069402 A1* | 3/2018 | Shuy | H02J 7/34 |
| 2019/0181646 A1* | 6/2019 | Fathy | H01M 10/46 |
| 2019/0211803 A1 | 7/2019 | Brombach | |
| 2020/0076196 A1* | 3/2020 | Lee | G05B 13/042 |

FOREIGN PATENT DOCUMENTS

| | | | |
|---|---|---|---|
| DE | 102011054971 A1 | | 5/2013 |
| DE | 102015101738 | * | 8/2016 |
| DE | 102015101738 A1 | | 8/2016 |
| DE | 102017205968 A1 | | 10/2018 |

* cited by examiner

METHOD FOR PROVIDING CONTROL POWER FOR AN ALTERNATING VOLTAGE SYSTEM BY MEANS OF AN ENERGY-GENERATING PLANT

CROSS REFERENCE TO RELATED APPLICATIONS

This application is a continuation of International Patent Application number PCT/EP2019/086378, filed on Dec. 19, 2019, which claims priority to German Patent Application number 10 2018 133 707.8, filed on Dec. 29, 2018, and is hereby incorporated by reference in its entirety.

FIELD

The disclosure relates to a method for providing balancing power for an AC voltage grid by means of an energy generation system with a photovoltaic generator and an energy store.

BACKGROUND

In an AC voltage grid that is constructed as a nationwide integrated grid, deviations of the grid frequency from a nominal frequency of the AC voltage grid can occur due to an imbalance between the electrical power fed in and the electrical power drawn. The imbalance and thus the frequency deviation can be counteracted by virtue of devices that can feed electrical power into the AC voltage grid and/or draw it from the AC voltage grid suitably adapting the power fed in or drawn by them. In particular, at frequencies that are above the nominal frequency, the power fed in can be reduced or the power drawn can be increased, while at frequencies that are below the nominal frequency, the power fed in is increased or the power drawn is reduced.

The respective change in the power of an energy generation system in direct or indirect response to a power imbalance in the power grid or to a frequency deviation resulting therefrom is usually referred to as balancing power. The balancing power is held by dedicated grid operating equipment in the form of a balancing reserve and, if necessary, is called up for a limited period of time. The energy generated when the balancing power is called up is referred to as balancing energy or balancing work. In AC voltage grids, such as the European integrated grid, for example, the provision of this balancing power is usually organized in stages that build on one another over time and supersede one another and have different modes of operation.

The first balancing stage, the so-called instantaneous control or instantaneous reserve, is used to limit the frequency rate of change. The instantaneous reserve is realized in present power grids as a grid property rather than active control, and is caused by devices that change their power in direct and immediate response to a change in frequency. In particular, rotating flywheel masses of generators or motors, due to their inertia, generate an instantaneous reserve power that directly counteracts the power imbalance and limit the frequency rate of change.

In the second balancing stage, the so-called primary control, which is used to maintain the frequency and which comes into play in the event of a persistent frequency deviation, use is made of devices that set their power in a targeted manner based on a characteristic curve depending on the deviation of the grid frequency from the nominal frequency. In the third stage, the so-called secondary control, a likely lasting or foreseeable power imbalance in the AC voltage grid is counteracted in a planned manner by devices being instructed by a superordinate control device to change their electrical power appropriately. The secondary control provides power and energy to restore the grid frequency to the nominal value and supersedes the second stage.

Devices that exchange electrical power between the AC voltage grid and an energy store are known from the prior art. Such devices can be set up to provide balancing power of the second balancing stage, that is to say to react to a power imbalance within the framework of the primary control and to adjust the power exchange between AC voltage grid and energy store accordingly in order to counteract the power imbalance. Balancing reserve power plants therefore have the task of providing a fixedly agreed amount of balancing power during a fixedly agreed time if required.

Also known are photovoltaic systems that are usually operated in such a way that a maximum possible power is drawn from the photovoltaic generators of the photovoltaic system and fed into the AC voltage grid. Due to the volatility and the poor predictability of the PV power, which can fluctuate greatly, for example in the event of changes in irradiation, and, in particular, is not even available at night, photovoltaic systems have so far only been able to contribute to a limited extent to the stabilization of the AC voltage grid by providing balancing power.

SUMMARY

The disclosure is directed to a method for providing balancing power for an AC voltage grid by means of an energy generation system with a photovoltaic generator and a store, using which balancing power for stabilizing the AC voltage grid can be made available inexpensively and efficiently.

In a method for providing balancing power for an AC voltage grid by means of an energy generation system, the energy generation system comprises a photovoltaic generator and an energy store. The energy generation system exchanges a total electrical power with the AC voltage grid. The total power exchanged is set as a function of a current maximum PV power, a predefinable basic PV power between zero and the maximum PV power and a provided or requested balancing power. The method comprises:
 if no balancing power is requested: feeding in a total basic power, which comprises the basic PV power;
 if negative balancing power is requested: reducing the PV power compared to the basic PV power; and
 if positive balancing power is requested: drawing a battery power from the battery if the requested positive balancing power is greater than the difference between the maximum PV power and the basic PV power.

By way of the method according to the disclosure, an energy generation system can be used optimally for providing balancing power. In this case, a negative balancing power is realized by reducing the PV power, wherein this reduction can include feeding back into the photovoltaic generator. As a result, a negative balancing power is available, which can at any time be at least the nominal power of the photovoltaic generator (subject to an appropriately efficient connection to the AC voltage grid). At the same time, the positive balancing power can be optimally realized by the energy store. As a result of the fact that the energy store does not have to contribute to the negative balancing power, a large part of its storage capacity can be reserved for the provision of positive balancing power.

The total basic power can include a battery power for charging the energy store if the energy store can be charged.

As a result, the total basic power is reduced compared to the basic PV power by a part of the PV power being used to charge the energy storage unit, provided that the energy storage unit is not fully charged. If negative balancing power is requested and the energy store can be charged, the battery power for charging the energy store can first be increased before the PV power is reduced compared to the basic PV power. As a result, the environmentally friendly energy generated by the photovoltaic generator is optimally used to charge the energy store.

In one embodiment of the method, the basic PV power can correspond to the maximum PV power. The photovoltaic generator can thus be operated optimally and generate the maximum possible energy in an environmentally friendly manner as long as the PV power is not reduced to reduce the total power of the energy generation system in order to provide negative balancing power.

In an alternative embodiment of the method, the basic PV power can be lower than the maximum PV power, wherein the PV power is increased compared to the basic PV power if positive balancing power is requested. Additional drawing of a battery power from the energy store takes place if the requested positive balancing power is greater than the difference between the basic PV power and the maximum PV power so that the total power includes the requested positive balancing power.

In an advantageous embodiment, the basic PV power is between 40% and 60% of the maximum PV power. This means that between 60% and 40% of the maximum PV power is available as additional positive balancing power.

In the method according to the disclosure, the requested balancing power can be determined as a function of a deviation of an instantaneous frequency from a nominal frequency of the AC voltage grid and/or a rate of change of the instantaneous frequency by means of a characteristic curve. The characteristic curve can be designed in such a way that positive balancing power is requested when the instantaneous frequency is lower than the nominal frequency and/or the rate of change is negative, and that negative balancing power is requested when the instantaneous frequency is greater than the nominal frequency and/or the rate of change is positive. As a result, the energy generation system can react independently to power imbalances in the AC voltage grid, which can manifest themselves, in particular, as deviations of the grid frequency from the nominal frequency.

In an alternative embodiment, the requested balancing power can be predefined to the energy generation system by a superordinate controller. As a result, if there is a specific need, the energy generation system can be controlled, for example by a grid operator, in such a way that a power imbalance is compensated for in a targeted manner by the superordinate controller.

The method according to the disclosure can furthermore comprise the balancing power for a predetermined future period of time being provided with a balancing power range, wherein the balancing power range has a maximum positive balancing power and a maximum negative balancing power, which can be set as deviations from the total basic power in the predetermined future period of time by the energy generation system. In this embodiment, the maximum positive and the maximum negative balancing power have the same magnitude, so that a symmetrical balancing power is provided for the predefined future period.

In this context, the term "provision" is to be understood to mean that it is guaranteed that an offered balancing power can and will be set in the future period of time if it is actually requested in the future period of time.

In one embodiment of the method, an optimal balancing power range for the future period of time can be determined before the future period of time in which balancing power is provided. For this purpose, in particular, the current maximum PV power, a forecast for the maximum PV power in the predetermined future period of time, a ratio of the nominal PV power to the nominal power of the energy store and/or a current state of charge of the energy store can be taken into account. For example, the more balancing power that can be offered, the higher the current and forecast maximum PV power; on the other hand, the offered balancing power can be limited by the nominal PV power if only this is available to provide negative balancing power, for example at night when the energy store is fully charged.

In one embodiment of the method, the total basic power corresponds or is proportional to the maximum PV power so that any variations in the maximum PV power lead to corresponding variations in the total basic power. In this embodiment, a requested balancing power can be provided as a deviation from the maximum PV power that would be fed in without a request for balancing power.

In an alternative embodiment of the method, the total basic power has a constant value. If no balancing power is requested and the maximum PV power is greater than the total basic power, the total basic power then exclusively comprises PV power. Any difference between the current PV power and the constant total basic power can then be compensated for by exchanging electrical power with the energy store. As a result, the behavior of the energy generation system can be better planned in that a defined exchange of power with the AC voltage grid takes place at all times, which is, in particular, independent of any short-term, for example weather-related, changes in the maximum PV power.

In one embodiment of the method, the photovoltaic generator and the energy store can exchange electrical power with one another and/or in each case bidirectionally with the AC voltage grid. Specifically, the energy generation system can for this purpose exchange the total electrical power with the AC voltage grid via exactly one common grid connection point. Alternatively, the photovoltaic generator and the energy store can exchange their respective electrical power with the AC voltage grid via different, physically separated grid connection points.

It goes without saying that the photovoltaic generator can comprise a plurality of sub-generators, which can be connected to the AC voltage grid via a corresponding plurality of inverters. Likewise, the energy store can comprise a plurality of batteries, which are connected to the AC voltage grid via a plurality of converters. In this embodiment, the photovoltaic generator and the energy store can be connected to the AC voltage grid in the same or in different local grids or on the same or different grid levels.

In an advantageous embodiment of the method, a control unit or circuit receives current operating data of the photovoltaic generator and the energy store and predetermines setpoint values for the respective power to be exchanged for the operation of the photovoltaic generator and the energy store. In this embodiment, the control unit can be part of the energy generation system, especially if it is connected to the AC voltage grid via a single common grid connection point, or it can be arranged at a superordinate level and connected to the photovoltaic generator and the energy store via a communication line. A control unit arranged in this way can have a uniform interface to a further superordinate controller, which is responsible for the operation of the AC voltage grid as a whole, for example, and to that extent represents a grid operator.

In one embodiment, the energy generation system can have at least two energy stores, wherein the photovoltaic generator and the first energy store provide balancing power for primary control of the AC voltage grid, whereas the second energy store provides balancing power for instantaneous control of the AC voltage grid. In particular, the second energy store can exchange an instantaneous balancing power with the AC voltage grid via a voltage-impressing inverter. By means of such a method, the energy generation system is able to optimally contribute both to the instantaneous control and to the primary control of the AC voltage grid.

An energy generation system for providing balancing power for an AC voltage grid comprises a photovoltaic generator, an energy store and a control unit. In an energy generation system according to the disclosure, the control unit is set up to operate the energy generation system using a method according to the above description.

In one embodiment of the energy generation system, the photovoltaic generator and the energy store are connected to the AC voltage grid via a common grid connection point. In this embodiment, the grid connection point can comprise a transformer with a grid-side winding and at least two windings for connecting the photovoltaic generator and the energy store. In addition, the energy generation system can have a plurality of photovoltaic generators and/or a plurality of energy stores, which are connected to the grid connection point via a common bidirectional inverter. The inverter is in one embodiment connected here to the photovoltaic generators or the energy stores via individual direct current converters. The use of a common inverter reduces both the number of devices required and the cabling effort, wherein the inverter can be designed for a total power that is lower than the sum of the nominal powers of the individual inverters in an energy generation system with inverters assigned individually to the photovoltaic generators and the energy stores.

Such an energy generation system advantageously comprises a control unit, which is arranged within the energy generation system and can communicate directly with the photovoltaic generator and the energy store or with their corresponding controllers.

In an alternative embodiment of the energy generation system, the control unit is communicatively connected via an indirect connection via a network to the photovoltaic generator and the energy store or to their corresponding controllers, wherein the photovoltaic generator and the energy store are connected to the AC voltage grid via different, physically separated grid connection points.

The energy generation system can comprise a plurality of energy stores of different designs. At least one of the energy stores can, for example, comprise a lithium-ion accumulator, which is characterized by a high energy density. In one embodiment, at least one further energy store can comprise a supercapacitor which, compared with the lithium-ion accumulator, has a lower energy density but a higher power density. An energy generation system constructed in this way can both provide primary balancing power by means of the lithium ion in connection with the photovoltaic generator and also contribute to instantaneous control by means of the supercapacitor.

In a further embodiment of the disclosure, a balancing power range can be defined for a predetermined future period of time, wherein the balancing power is provided by an energy generation system with a photovoltaic generator and an energy store and the balancing power range has a total basic power, a maximum positive balancing power and a maximum negative balancing power. This embodiment can comprise:

determination of the total basic power as a function of a current maximum PV power of the photovoltaic generator of a state of charge of the energy store, determination of the maximum positive balancing power as a function of the state of charge of the energy store, determination of the maximum negative balancing power as a function of the maximum PV power and a maximum nominal PV power that can be fed back into the photovoltaic generator.

In this embodiment, the total basic power and the maximum positive balancing power can be determined in such a way that it is excluded that a request for the maximum positive balancing power for the predetermined future period of time leads to a complete discharge of the energy store, wherein the total basic power is determined by a difference lower than the current maximum PV power, wherein the difference is greater the more the charge state of the store deviates from a fully charged state.

In order to provide a defined, maximum positive balancing power that is reliably available at all times, it is advantageous in one embodiment to operate the energy store of the energy generation system permanently in the full state of charge. In order that the energy generation system achieves a maximum negative balancing power even with a fully charged store and at night, it is possible to feed back into the photovoltaic generator, wherein the possible feedback power should at least correspond to the battery power. Available PV power is used to charge the store whenever possible and to keep the state of charge as high as possible. The disclosure allows full utilization of the energy storage capacity with an almost always fully charged store and full availability of the maximum positive and negative balancing power. By integrating the photovoltaic generator in the method according to the disclosure, a symmetrical balancing power can be provided, which is at least twice as high as could be achieved individually with a corresponding energy store.

BRIEF DESCRIPTION OF THE FIGURES

The following text further explains and describes the disclosure with reference to example embodiments illustrated in the figures.

DETAILED DESCRIPTION

Figure 1:
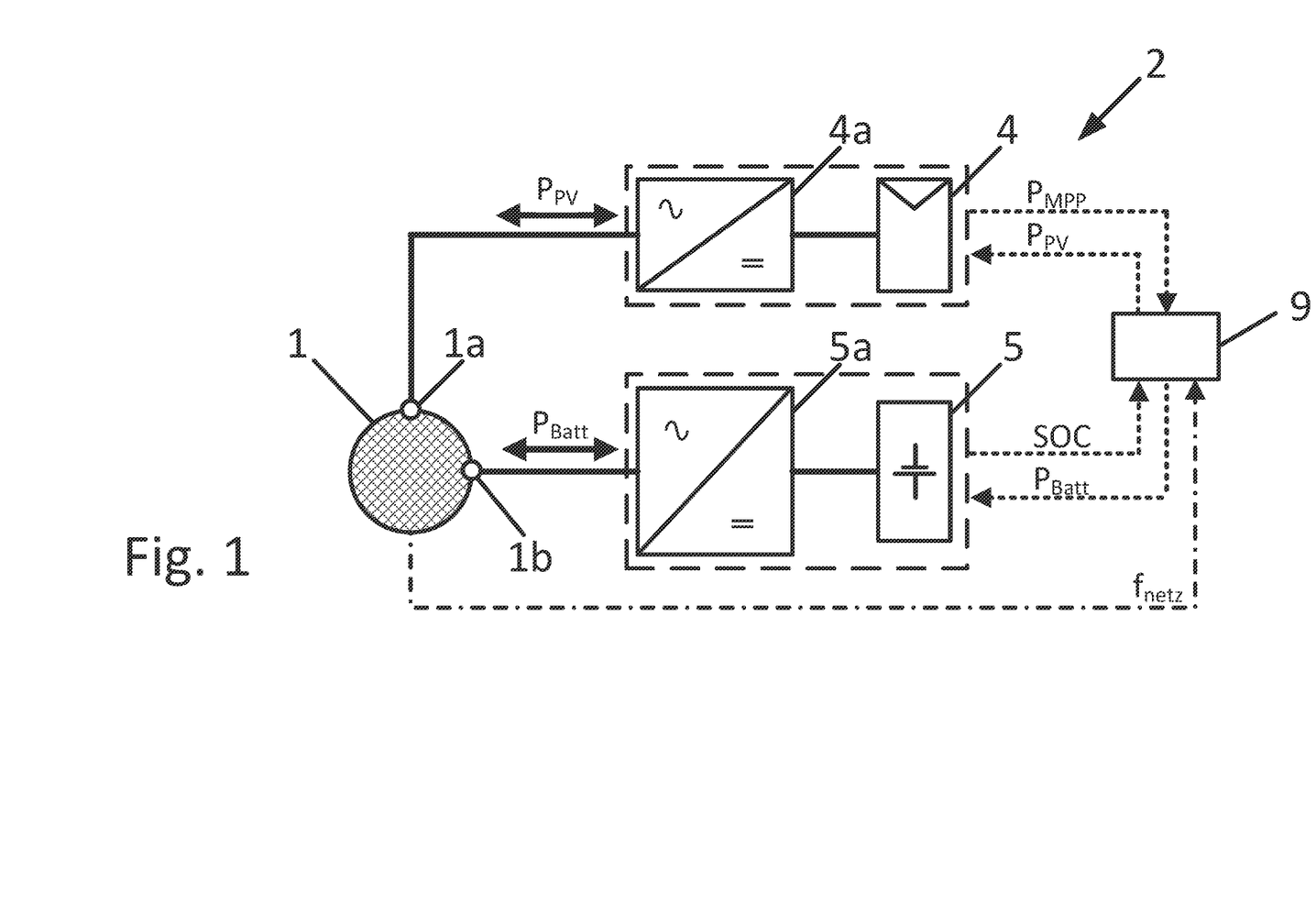
FIG. 1 shows an energy generation system according to the disclosure with a PV generator, an energy store and a control unit.

FIG. 1 shows an energy generation system 2 with a photovoltaic generator 4 and an energy store 5.

The photovoltaic generator 4 can generate a maximum electrical PV power P_MPP depending on the current solar radiation. An inverter 4a draws a current PV power P_PV from the photovoltaic generator 4, which can be varied between zero and the maximum PV power P_MPP, in particular by setting the voltage at the photovoltaic generator 4. The PV power P_PV can also assume negative values in that electrical power is fed back into the photovoltaic generator 4. Conventional PV modules are able to easily receive a power in the order of magnitude of their nominal PV power P_Peak. The inverter 4a converts the PV power P_PV exchanged in this way as direct current with the photovoltaic generator 4 to an alternating current and exchanges the PV power P_PV with an AC voltage grid 1 via a grid connection point 1a.

The energy store 5 is connected to a converter 5a, which exchanges an electrical battery power P_Batt with the energy store 5, converts it to an alternating current and exchanges it as battery power P_Batt via a grid connection point 1b with the AC voltage grid 1. The energy store 5 usually has a specific storage capacity and a current state of charge SOC, wherein the state of charge SOC regularly indicates in percent how much energy is currently stored in the energy store relative to the storage capacity. An SOC of zero thus means that the energy store 5 is discharged and an SOC of 100% indicates that the energy store 5 is fully charged.

The energy generation system 2 exchanges a total electrical power P_Netz with the AC voltage grid 1. The total power P_Netz is made up of the PV power P_PV and the battery power P_Batt and can assume positive or negative values.

The grid connection points 1a and 1b can be replaced by a common grid connection point, that is to say the energy generation system 2 can also exchange the total power with the AC voltage grid 1 via a single, common grid connection point. A common grid connection for a plurality of bidirectional inverters 4a and/or converters 5a can comprise a transformer, which comprises a grid-side winding and a plurality of windings for connecting the devices of the energy generation system 2. As a result, a plurality of actuators involved in the exchange of electrical power with the grid can be connected directly to the transformer. The transformer must be designed for a nominal power that only comprises the nominal power of the photovoltaic generator 4 and an overload capacity for (short-term) retrieval of positive balancing power from the energy store 5.

A control unit 9 is communicatively connected to the photovoltaic generator 4 and the energy store 5 or to the inverter 4a and the converter 5a. In one aspect, the control unit 9 receives operating data from the photovoltaic generator 4 and the energy store 5 via this connection. In another aspect, the control unit 9 sends setpoint values for the PV power P_PV and the battery power P_Batt to the photovoltaic generator 4 and the energy store 5 or the inverter 4a and the converter 5a (or else their corresponding control devices).

The photovoltaic system formed from the photovoltaic generator 4 and the inverter 4a can comprise a large number of subunits, which are not shown in detail here. In particular, this can be a photovoltaic system with a large number of inverters 4a and a corresponding number of photovoltaic generators 4, which are controlled by a common system controller. The storage system formed from the energy store 5 and the converter 5a can likewise comprise a large number of subunits, which are not shown in detail here. In particular, this can be a storage system with a large number of converters 5a and a corresponding number of energy stores 5, which are controlled by a common system controller. The energy generation system 2 can comprise, for example, a plurality of energy stores 5 of different types, which are connected to the AC voltage grid 1 via a plurality of converters 5a at a common grid connection point 1b. Possible storage types include, for example, electrochemical stores, that is to say lead-acid, lithium-ion or flow batteries and so-called supercapacitors (supercaps), as well as other energy stores suitable for providing balancing power, such as pumped storage.

As an alternative or in addition, the energy generation system 2 can comprise a plurality of PV generators 4 and/or energy stores 5 of different types. In this embodiment, a plurality of PV generators 4 and/or energy stores 5 can be connected to a common inverter via in each case individual direct current converters and can exchange electrical power bidirectionally with the AC voltage grid 1 via this inverter.

In the energy generation system 2, the control unit 9 communicates with the respective system controllers of the photovoltaic system and the storage system and exchanges the corresponding operating data P_MPP, SOC and the setpoint values P_PV, P_Batt with them. Energy stores 5 of different types within the energy generation system 2 are operated in this case with different specifications, for example by operating a first energy store 5 with a lithium-ion battery, which has a high energy density, differently to a second energy store 5 with a supercapacitor, which has a comparatively low energy density but a significantly higher power density.

In principle, the control unit 9 can also be realized as part of the photovoltaic system or the storage system, in that the respective operating data are exchanged directly between the photovoltaic system and the storage system. In particular, the control unit 9 can coincide with a controller of the inverter 4a and receive the operating data directly from the storage system. This can be advantageous because, due to its design, the inverter 4a already includes fast measurement of frequency, current and power and therefore enables a faster reaction than via a "diversion" via a control unit 9 arranged elsewhere.

In a specific embodiment of the method, current operating data of the photovoltaic generator, in particular the maximum PV power and the current and possibly a planned PV power, and of the energy store, for example, the state of charge and the current and possibly a planned battery power, can be exchanged directly between the photovoltaic generator 4 and the energy store 5. The corresponding controllers of the photovoltaic generator 4 and of the energy store 5 are then set up on the one hand to act autonomously and on the other hand to take into account the behavior of the respective other party involved in providing the balancing power.

In addition, the control unit 9 can receive information about a current operating state of the AC voltage grid 1. In particular, the control unit can detect or receive the grid frequency f_netz of the AC voltage grid 1, possibly also from the inverter 4a. The grid frequency f_netz is, among other things, an indicator for the power balance in the AC voltage grid 1 and can be used by the control unit 9 to determine a demand for balancing power that is to be provided by the energy generation system 2, in particular by the total power P_Netz exchanged between the energy generation system 2 and the AC voltage grid 1 being varied in response to deviations of the grid frequency f_netz from a nominal frequency of the AC voltage grid 1.

As an alternative or in addition, the control unit 9 can be connected to a superordinate controller and can be instructed by this controller to vary the total power P_Netz exchanged to a predetermined extent and to make the instructed balancing power available in this way. In addition, it can be provided that the control unit 9 informs a superordinate controller how much balancing power can be made available by the energy generation system 2 in a predetermined future period of time.

The grid connection points 1a and 1b can be arranged physically remote from one another, for example, in the same or in different local grids or on the same or different grid levels. The communication between the control unit 9 and the devices of the energy generation system 2 and between the control unit 9 and a superordinate controller can each take place via a direct cable connection or indirectly via a network.

Figure 2:
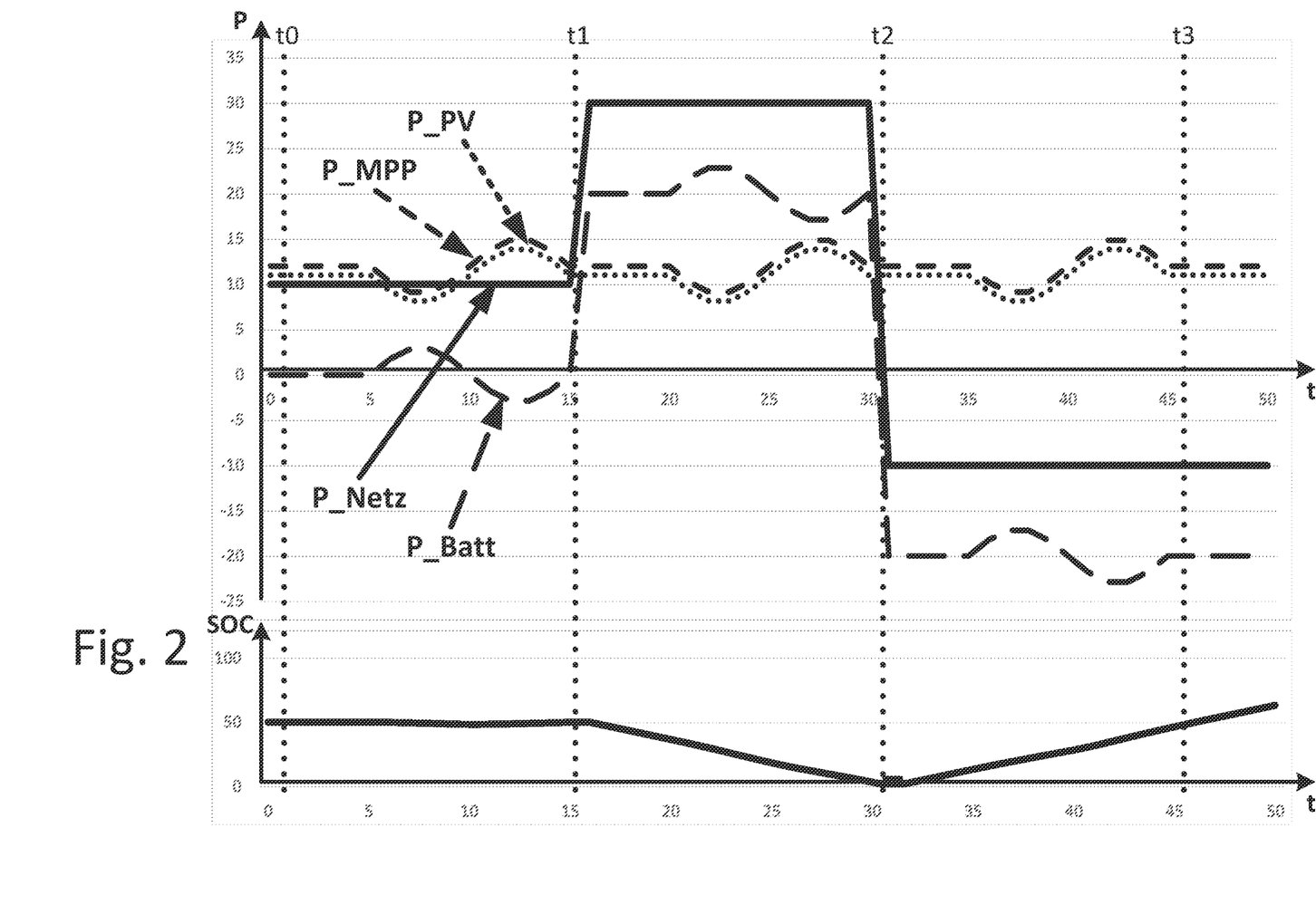
FIG. 2 shows a first time profile of electrical powers of the PV generator, the energy store, the energy generation system and a state of charge of the energy store.

The top part of FIG. 2 shows an example time profile of electrical powers P of the photovoltaic generator 4 (maximum PV power P_MPP and PV power P_PV), of the energy store 5 (battery power P_Batt) and of the energy generation system 2 (total power P_Netz) and the lower part shows a corresponding time profile of a state of charge SOC of the energy store 5. The units on the axes are to be understood as examples and are to be scaled in accordance with a specific embodiment of the energy generation system 2. For example, the time t can be specified in minutes and the power P in kilowatts or megawatts.

At the time t0, the photovoltaic generator 4 is operated in such a way that the PV power P_PV essentially corresponds to the maximum PV power P_MPP, that is to say the photovoltaic generator 4 generates the maximum possible power P_MPP, which, minus any losses, is fed in as PV power P_PV via the inverter 4a. The battery power P_Batt is equal to zero at the time t0, so that the total power P_Netz of the energy generation system 2 corresponds to the PV power P_PV (minus any losses).

A variation in the maximum PV power P_MPP, for example due to a change in the irradiation on the photovoltaic generator 4, can be passed through to the AC voltage grid 1 as a variation in the total power P_Netz. Alternatively, the total power P_Netz of the energy generation system 2 can be kept constant at a total basic power P_Netz_0, in that the PV power P_PV follows the variation of the maximum PV power P_MPP and the difference between the PV power P_PV and the constant total basic power P_Netz_0 is balanced with the energy store 5 through a suitable exchange of battery power P_Batt.

In the example according to FIG. 1, the variation of the maximum PV power P_MPP and thus also the PV power P_PV in the period of time t0 to t1 is compensated for by an opposing battery power P_Batt in such a way that the total power P_Netz is kept constant at the total basic power P_Netz_0. As a result, the state of charge SOC of the energy store 5 changes only slightly. A constant, guaranteed total power P_Netz for a predetermined period of time is particularly advantageous for the ability of the grid operator to plan the control of the operation of the AC voltage grid 1.

In the period of time t1 to t2, a positive balancing power is requested from the energy generation system 2 and provided by increasing the total power P_Netz. The request arises, for example, due to a reduction in the grid frequency, which indicates a power deficit in the AC voltage grid 1, or due to an explicit request by a superordinate controller. Since the PV power P_PV already corresponds to the maximum PV power P_MPP and therefore cannot be increased, the increase in the total power P_Netz by the positive balancing power is achieved by increasing the battery power P_Batt. The state of charge SOC of the energy store 5 drops accordingly. In the period of time t1 to t2, variations in the maximum PV power P_MPP can also be compensated for by opposing changes in the battery power P_Batt in order to feed in a constant total power P_Netz. In the example according to FIG. 1, the total power P_Netz in the period of time t1 to t2 corresponds to the sum of the total basic power P_Netz_0 and the requested positive balancing power.

At the time t2, the state of charge SOC of the energy store 5 is close to zero, that is to say no positive balancing power can be provided beyond the time t2. In addition, the positive balancing power requested in the period of time t1 to t2 should not have been higher, otherwise the energy store 5 would have been empty even before the time t2 and the balancing power would have ceased prematurely. In other words, in the period of time t1 to t2 the maximum possible positive balancing power for this period of time was requested from the energy generation system 2.

In the period of time t2 to t3, a negative balancing power is requested from the energy generation system 2 and provided by reducing the total power P_Netz. The request arises, for example, due to an increase in the grid frequency, which indicates a power excess in the AC voltage grid 1, or due to an explicit request by a superordinate controller. The PV power P_PV continues to correspond to the maximum PV power P_MPP, and the reduction in the total power P_Netz by the negative balancing power is achieved by reducing the battery power P_Batt. The total power P_Netz is reduced compared to the PV power P_PV by feeding the battery power P_Batt into the energy store 5. The state of charge SOC of the energy store 5 rises accordingly. In the period of time t2 to t3, variations in the maximum PV power P_MPP can also be compensated for by opposing changes in the battery power P_Batt in order to feed in a constant total power P_Netz. In the example according to FIG. 1, the total power P_Netz in the period of time t2 to t3 corresponds to the sum of the total basic power P_Netz_0 and the requested negative balancing power.

At the time t3, the state of charge SOC of the energy store 5 has returned to the starting value at the time t0 or t1. In an aspect, negative balancing power can be provided beyond the time t3, until the state of charge SOC of the energy store 5 reaches the value 100% and the energy store 5 can no longer draw power.

The behavior according to FIG. 1 can be optimized to offer a symmetrical balancing power in a future period of time and to provide it accordingly when there is a corresponding request. This means, for example, that before the time t1 a decision is made to offer a balancing power at a certain level for the period of time t1 to t2. Because it cannot be predicted whether this balancing power will be requested as positive or negative balancing power in the period of time t1 to t2, the state of charge SOC of the energy store 5 at the time t1 is around 50% in order to deliver a maximum symmetrical balancing power, that is to say positive or negative with the same amount for the entire period of time t1 to t2. If the state of charge SOC is greater than 50%, less energy is available for negative than for positive balancing power and vice versa, such that the maximum balancing power that can be offered is reduced if the state of charge SOC deviates from 50% at the time t1.

Figure 3:
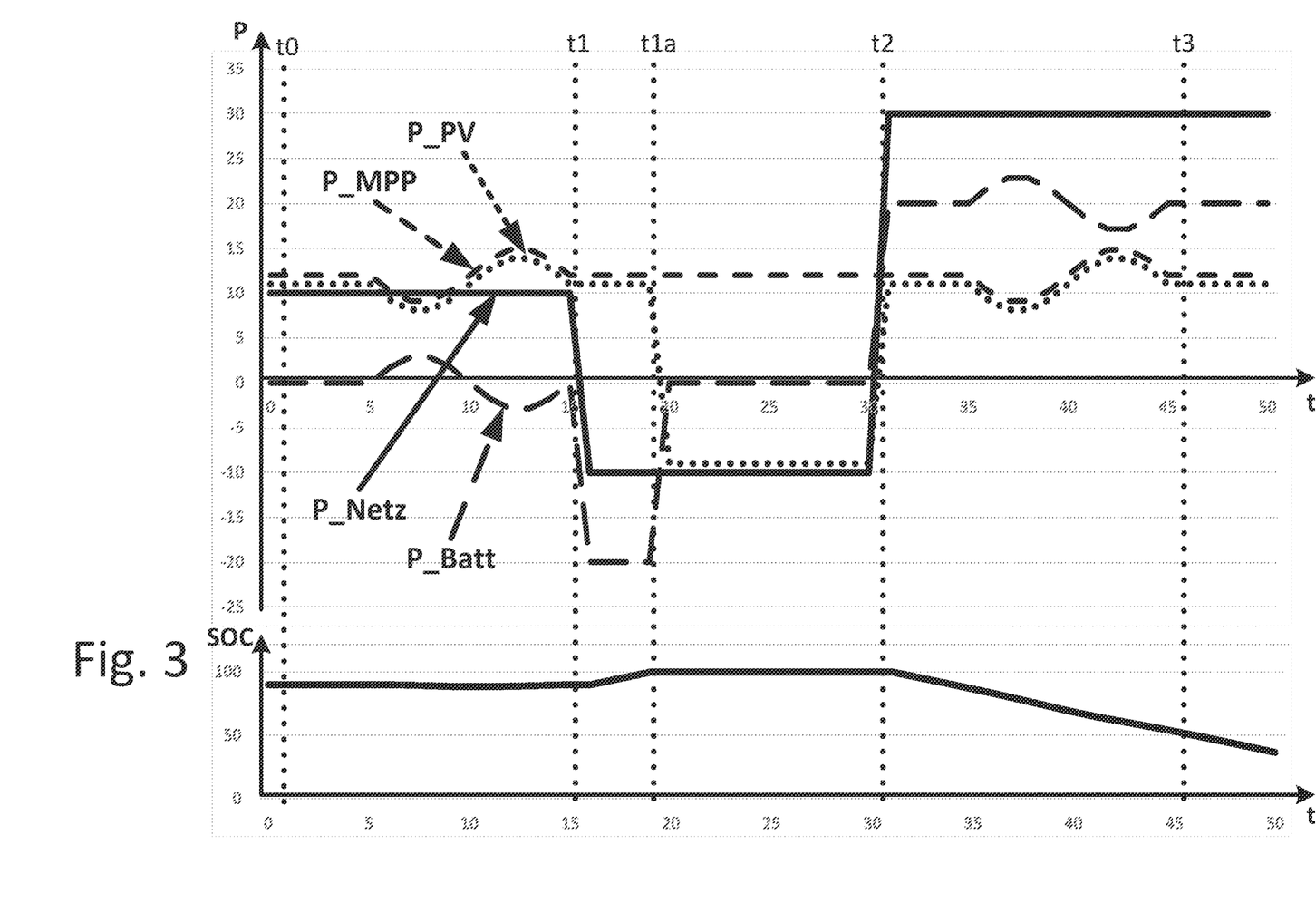
FIG. 3 shows a second time profile of electrical powers of the PV generator, the energy store, the energy generation system and a state of charge of the energy store.

The upper part of FIG. 3 shows a further example time profile of the electrical powers P_MPP, P_PV, P_Batt and P_Netz and the lower part shows a corresponding time profile of the state of charge SOC.

At the time t0, the PV power P_PV corresponds to the maximum PV power P_MPP and is fed in via the inverter 4a.

The total power P_Netz of the energy generation system 2 corresponds to the PV power P_PV, since the battery power P_Batt is equal to zero at the time t0. A variation in the maximum PV power P_MPP can be compensated for by opposing changes in the battery power P_Batt in order to keep the total power P_PV in the period of time t0 to t1 at a constant total basic power P_Netz_0. The state of charge SOC of the energy store 5 varies slightly accordingly. Alternatively (not shown here), a variation of the maximum PV power P_MPP can be passed through to the AC voltage grid 1 as a variation of the total power P_Netz.

In the period of time t1 to t2, a negative balancing power is requested from the energy generation system 2 and provided by reducing the total power P_Netz. For this purpose, a power P_Batt is initially fed into the energy store 5 in the period of time t1 to t1a until it is fully charged and has a state of charge SOC of 100%. In the period of time t1a to t2, the energy store 5 can then no longer take up any battery power P_Batt. The total power P_Netz is now reduced by the requested negative balancing power by virtue of the PV power P_PV being reduced compared to the maximum PV power P_MPP. Because the sum of the total basic power P_Netz_0 and the negative balancing power is negative in the period of time t1a to t2, the PV power P_PV also becomes negative in that electrical power is fed back into the photovoltaic generator 4. Any variations in the maximum PV power P_MPP have no effect in the period of time t1a to t2. The state of charge SOC of the energy store 5 remains at 100%.

In the period of time t2 to t3, a positive balancing power is requested from the energy generation system 2 and provided by increasing the total power P_Netz. The PV power P_PV is set to the maximum PV power P_MPP. The increase in the total power P_Netz by the positive balancing power compared to the total basic power P_Netz_0 at the time t1 is realized by increasing the battery power P_Batt, that is to say power is drawn from the energy store 5. The state of charge SOC of the energy store 5 drops accordingly. Variations in the maximum PV power P_MPP and thus the PV power P_PV can be compensated for by corresponding opposing changes in the battery power P_Batt in order to keep the total power P_Netz constant.

At the time t3, the state of charge of the energy store 5 is approximately 50%, that is to say further positive balancing power can be provided beyond the time t3. Alternatively, in the period of time t2 to t3, twice as high a positive balancing power could have been made available as was actually made available.

In an embodiment according to FIG. 3, almost the entire storage capacity of the energy store 5 is thus available for providing positive balancing power, since negative balancing power is provided completely by changing the PV power P_PV in case of doubt. The state of charge SOC of the energy store 5 can therefore advantageously be almost 100% at the time t1 in order to ensure a maximum positive part of a symmetrical balancing power for the period of time t1 to t2, with a reserve capacity of the energy store 5 possibly being able to be kept available to compensate for fluctuations in the maximum PV power P_MPP. The maximum negative part of the symmetrical balancing power is only limited by the nominal PV power P_Peak of the photovoltaic generator 4. Feeding back into the photovoltaic generator 4 in the amount of the nominal PV power P_Peak is possible at any time, especially at night.

Compared to the embodiment according to FIG. 1, in which the energy store 5 is able to realize the required balancing power both positively and negatively on its own, in the embodiment according to FIG. 3 with the same energy store 5, a greater symmetrical balancing power can be offered that can be up to double as high if the nominal PV power P_Peak corresponds at least to the maximum positive balancing power that can be offered for a future period, which in turn results from the quotient of the storage capacity of the energy store 5 and the duration of the future period.

Figure 4:
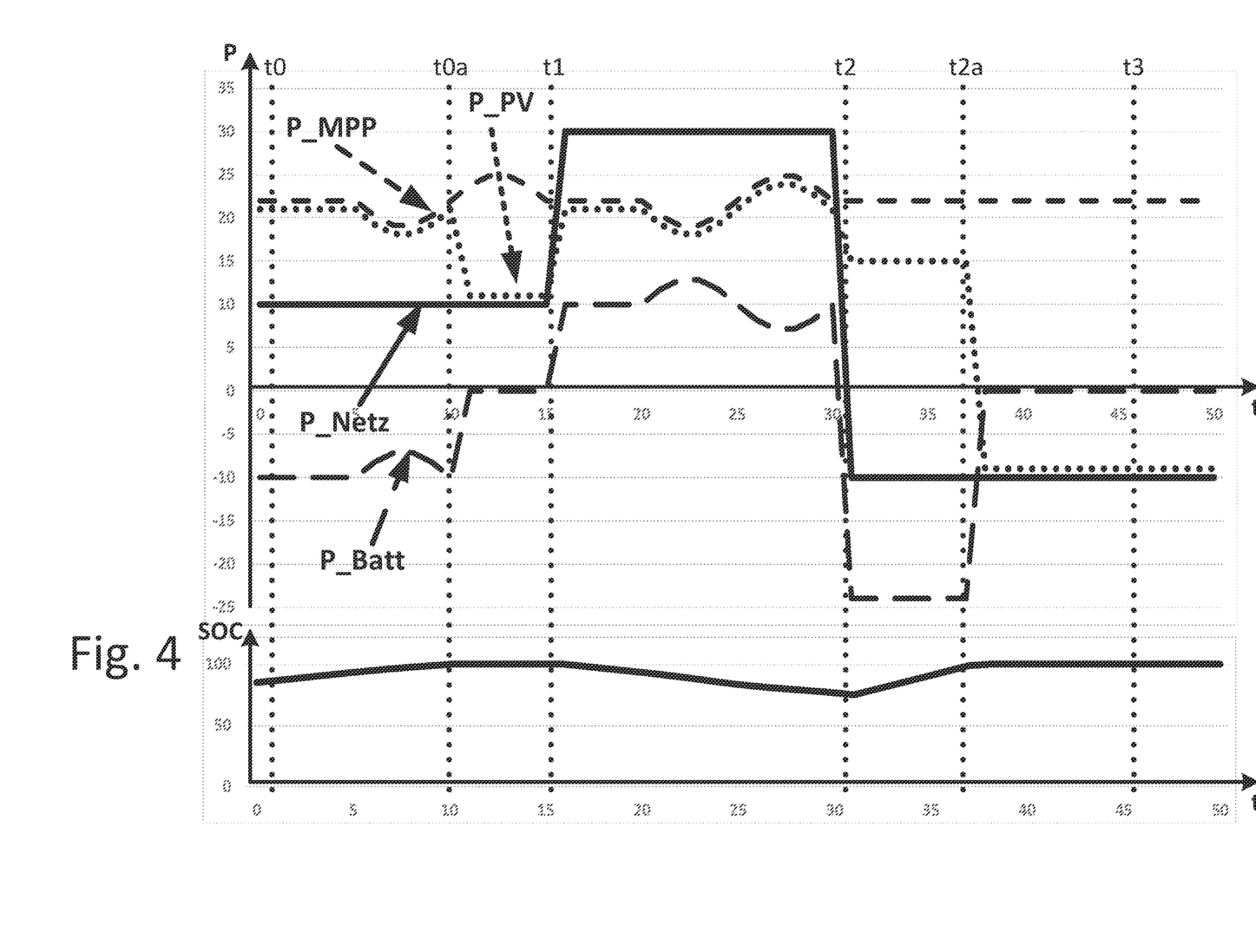
FIG. 4 shows a second time profile of electrical powers of the PV generator, the energy store, the energy generation system and a state of charge of the energy store.

The upper part of FIG. 4 shows a further example time profile of the electrical powers P_MPP, P_PV, P_Batt and P_Netz and the lower part shows a corresponding time profile of the state of charge SOC.

At the time t0, the PV power P_PV essentially corresponds to the maximum PV power P_MPP and is fed in via the inverter 4a. The state of charge SOC of the energy store 5 is below 100% such that the energy store 5 is charged with the battery power P_Batt. The total power P_Netz of the energy generation system 2 corresponds to the PV power P_PV minus the battery power P_Batt. A variation in the maximum PV power P_MPP can be compensated for by opposing changes in the battery power P_Batt in order to keep the total power P_PV in the period of time t0 to t0a at a constant total basic power P_Netz_0.

At the time t0a, the energy store 5 is fully charged and can no longer take up battery power P_Batt. However, the total power P_Netz is kept constant by reducing the PV power P_PV compared to the maximum PV power P_MPP to a basic PV power P_PV_0, which corresponds to the total basic power P_Netz_0 of the energy generation system 2. Any variations in the maximum PV power P_MPP have no effect in the period of time t0a to t1. The state of charge SOC of the energy store 5 remains at 100%.

In the period of time t1 to t2, a positive balancing power is requested from the energy generation system 2 and provided by increasing the total power P_Netz. The PV power P_PV is set to the maximum PV power P_MPP. If the PV power P_PV, which is increased in such a way in comparison to the total basic power P_Netz_0, is not sufficient to provide the requested positive balancing power, the battery power P_Batt is increased in such a way that the difference between the total power P_Netz (including positive balancing power) that is to be set and the maximum PV power P_MPP is drawn from the energy store 5. The state of charge SOC of the energy store 5 drops accordingly. Variations in the maximum PV power P_MPP and thus the PV power P_PV can be compensated for by corresponding opposing changes in the battery power P_Batt in order to keep the total power P_Netz constant.

At the time t2, the state of charge SOC of the energy store 5 has fallen by approximately 25%; this is significantly less than in the equally long periods of time t1 to t2 in FIGS. 2 and t2 to t3 in FIG. 3, although the same positive balancing power was provided by the energy generation system 2. By providing a portion of the required positive balancing power by way of the photovoltaic generator 4, the energy store 5 is relieved of load, as it were, and the energy generation system 2 can deliver positive balancing power over a longer period of time, or an overall higher positive balancing power can be achieved over a predetermined future period of time by the energy generation system 2 without changing anything at the energy store 5.

In the period of time t2 to t3, a negative balancing power is requested from the energy generation system 2 and provided by reducing the total power P_Netz. For this purpose, a battery power P_Batt is first fed into the energy store 5 in the period of time t2 to t2a. If the reduction in total power P_Netz achievable in this way is not sufficient to provide the requested negative balancing power, for example because the maximum power that can be fed into the energy store 5 is limited, the PV power P_PV is reduced compared to the maximum PV power P_MPP. By feeding the battery power P_Batt into the energy store 5, the state of charge SOC of the energy store 5 increases.

At the time t2a, the state of charge SOC is 100%, that is to say the energy store 5 is fully charged and can no longer take up battery power P_Batt. The total power P_Netz is kept constant by virtue of the PV power P_PV being further reduced and possibly becoming negative in that electrical power is fed back into the photovoltaic generator 4. The total power P_Netz in the period of time t2a to t3 thus remains constant at a value that corresponds to the sum of the total basic power at the time t0 or t1 and the requested negative balancing power. The state of charge SOC of the energy store 5 remains at 100%.

The definition of the basic PV power P_PV_0 according to FIG. 4 can also be transferred to the embodiments according to FIGS. 2 and 3 in that the basic PV power P_PV_0 there corresponds directly to the maximum PV power P_MPP, which in turn is at least indirectly used as the basis for determining the total basic power P_Netz_0 of the energy generation system 2. In the embodiment according to FIG. 4, the basic PV power P_PV_0 is reduced compared to the maximum PV power. As a result, the PV power can be increased if necessary and thus contribute to the provision of positive balancing power by way of the energy generation system 2.

In an embodiment according to FIG. 4, the basic PV power P_PV_0 can be selected between zero and the maximum PV power P_MPP such that the PV power P_PV can be increased in order to make a contribution to the positive balancing power. It has proven to be particularly advantageous to select the basic PV power at around 40% to 60% of the maximum PV power so that around half of the maximum PV power is available as positive balancing power and the other half is available as negative balancing power. These proportions add to the negative balancing power that is already at least available in the embodiment according to FIG. 2 by feeding back into the photovoltaic generator 4 and the available positive balancing power by drawing battery power P_Batt from the energy store 5.

In an embodiment according to FIG. 4, a positive balancing power can thus be guaranteed for a predetermined future period of time, which is calculated from of the storage capacity of the energy store 5 at the beginning of the period of time divided by the duration of the future period of time plus the difference between the basic PV power P_PV_0 and the maximum PV power P_MPP. The guaranteed negative balancing power for the future period of time corresponds to the nominal PV power P_Peak plus the basic PV power P_PV_0. Compared to the embodiment according to FIG. 3, an even greater symmetrical balancing power can thus be offered.

Figure 5:
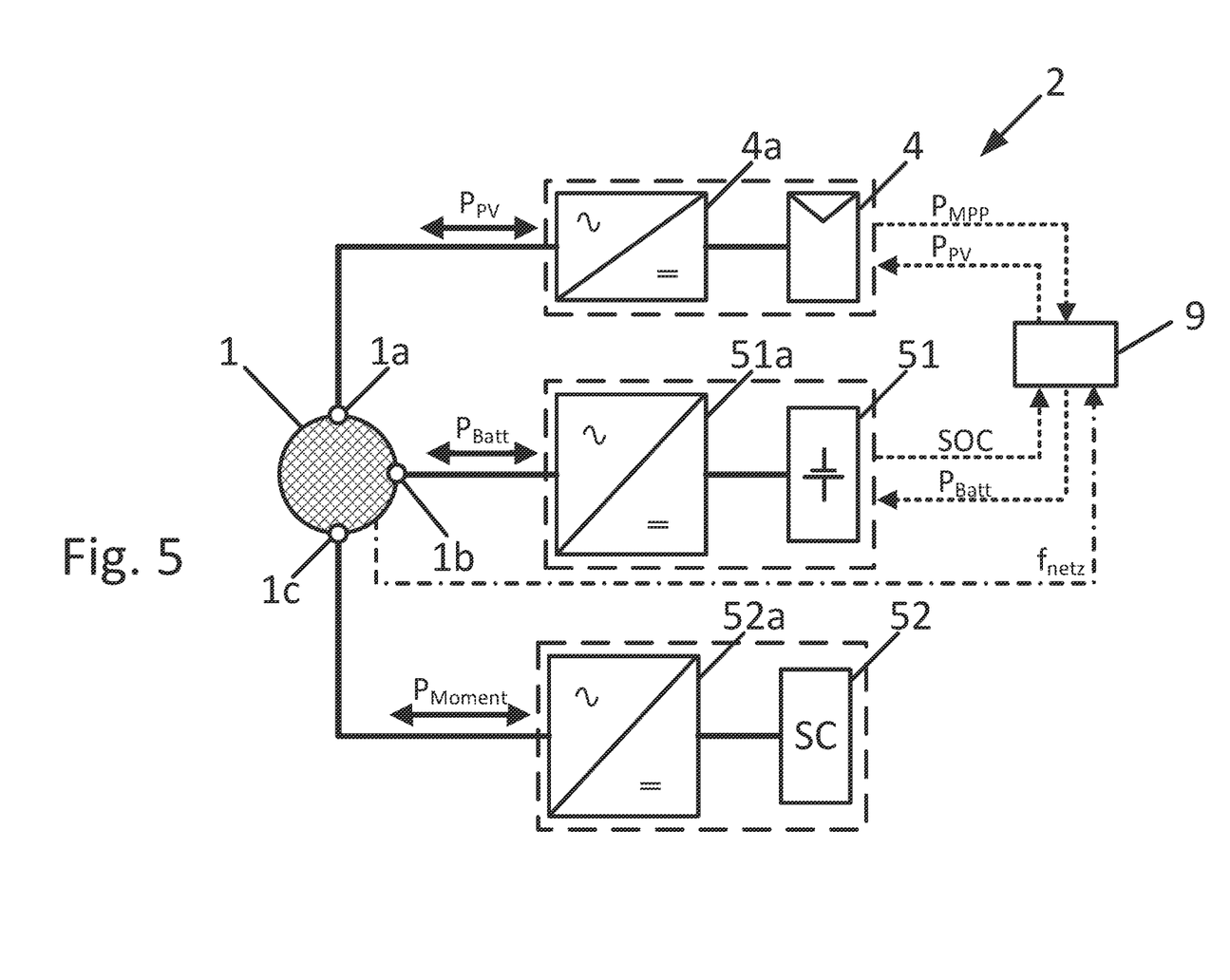
FIG. 5 shows a further energy generation system according to embodiments with a PV generator and energy stores of different types.

FIG. 5 shows an embodiment of an energy generation system 2 with a photovoltaic generator 4 and a plurality of energy stores 51, 52 of different types. The energy store 51 can be set up to act in cooperation with the photovoltaic generator 4 according to one of the methods described with reference to FIGS. 2-4, so that the energy generation system 2 provides balancing power for the primary and/or secondary control of the AC voltage grid 1.

The additional energy store 52 can be designed as a store with a particularly high power density, in particular as a so-called supercapacitor (supercap, SC for short). This energy store 52 can then be operated largely independently of the energy store 51 and can exchange an electrical power P_Moment with the AC voltage grid 1 via the grid connection point 1c. The grid connection point 1c can be designed separately from the grid connection points 1a, 1b or can be realized with them in a common device, for example as an individual system-side winding of a transformer with a common grid-side winding. The transformer can be designed in this case for a nominal power that only comprises the nominal power of the photovoltaic generator 4 and an overload capacity for the short-term retrieval of the instantaneous balancing power P_Moment from the energy store 52. As such, a targeted direct or indirect exchange of electrical power between the energy store 52 and the photovoltaic generator 4 or the energy store can be set, for example, in order to set or restore the state of charge of the energy store 52 to a setpoint value as required.

The electrical power P_Moment can be adjusted by means of a suitable converter 52a as a function of the grid frequency in such a way that the instantaneous control of the AC voltage grid 1 is supported. In particular, the electrical power P_Moment can be set as a direct function of the rate of change of the grid frequency in order to counteract rapid changes in the grid frequency and thus stabilize the AC voltage grid 1. To this end, it has proven to be particularly advantageous to operate the converter 52a with voltage-impressing control which, for example, emulates the behavior of a synchronous machine (so-called virtual synchronous machine, VSM for short).

The invention claimed is:

1. A method for providing balancing power for an AC voltage grid using an energy generation system, wherein the energy generation system comprises a photovoltaic generator and an energy store, comprising:
   exchanging a total power (P_Netz) with the AC voltage grid, wherein the total power (P_Netz) exchanged is set as a function of a current maximum PV power (P_MPP), a basic PV power (P_PV_0) that is predefined between zero and the current maximum PV power (P_MPP), and a provided or requested balancing power;
   when no balancing power is requested: feeding in a total basic power (P_Netz_0), which comprises the basic PV power (P_PV_0);
   when a negative balancing power is requested: reducing a PV power (P_PV) compared to the basic PV power (P_PV_0); and
   when a positive balancing power is requested: drawing a battery power (P_Batt) from the energy store in response to the provided or requested positive balancing power being greater than a difference between the current maximum PV power (P_MPP) and the basic PV power (P_PV_0),
   wherein the basic PV power (P_PV_0) is lower than the current maximum PV power (P_MPP), and
   wherein the PV power (P_PV) is increased compared to the basic PV power (P_PV_0) when the positive balancing power is requested.

2. The method as claimed in claim 1, wherein reducing the PV power (P_PV) to provide the negative balancing power comprises feeding back electrical power into the photovoltaic generator such that the PV power (P_PV) assumes a negative value.

3. The method as claimed in claim 1, wherein the total basic power (P_Netz_0) comprises the battery power (P_Batt) for charging the energy store when the energy store is charged.

4. The method as claimed in claim 3, wherein the battery power (P_Batt) for charging the energy store is first increased when the negative balancing power is requested and the energy store is charged.

5. The method as claimed in claim 1, wherein the basic PV power (P_PV_0) corresponds to the current maximum PV power (P_MPP).

6. The method as claimed in claim 1, further comprising: additionally drawing of the battery power (P_Batt) from the energy store in response to the provided or requested positive balancing power being greater than the difference between the basic PV power (P_PV_0) and the current maximum PV power (P_MPP), so that the total power (P_Netz) includes the provided or requested positive balancing power.

7. The method as claimed in claim 6, wherein the basic PV power (P_PV_0) is between 40% and 60% of the current maximum PV power (P_MPP).

8. The method as claimed in claim 1, further comprising: determining the provided or requested balancing power as a function of a deviation of an instantaneous frequency (f_netz) from a nominal frequency (f_Nenn) of the AC voltage grid and/or a rate of change of the instantaneous frequency (f_netz) by a characteristic curve, wherein the positive balancing power is requested when the instantaneous frequency (f_netz) being lower than the nominal frequency (f_Nenn) and/or the rate of change being negative, and wherein the negative balancing power is requested when the instantaneous frequency (f_netz) is greater than the nominal frequency (f_Nenn) and/or the rate of change is positive.

9. The method as claimed in claim 1, wherein the provided or requested balancing power is predefined to the energy generation system by a superordinate controller.

10. The method as claimed in claim 1, wherein the total basic power (P_Netz_0) corresponds or is proportional to the current maximum PV power (P_MPP) so that any variations in the current maximum PV power (P_MPP) lead to corresponding variations in the total basic power (P_Netz_0).

11. The method as claimed in claim 1, wherein the total basic power (P_Netz_0) has a constant value, wherein, when no balancing power is requested and/or the current maximum PV power (P_MPP) is greater than the total basic power (P_Netz_0), the total basic power (P_Netz_0) exclusively comprises the PV power (P_PV), and a difference between the current PV power (P_PV) and the total basic power (P_Netz_0) is compensated for by exchanging electrical power (P_Batt) with the energy store.

12. The method as claimed in claim 1, further comprising: exchanging, via the photovoltaic generator and the energy store, electrical power (P_PV, P_Batt) therebetween and/or bidirectionally with the AC voltage grid.

13. The method as claimed in claim 1, further comprising: exchanging, via the energy generation system, the total electrical power (P_Netz) with the AC voltage grid via a grid connection point.

14. The method as claimed in claim 1, wherein the photovoltaic generator and the energy store exchange their respective electrical power (P_PV, P_Batt) with the AC voltage grid via different, physically separated grid connection points.

15. The method as claimed in claim 1, further comprising: receiving, via a control unit, current operating data (P_MPP, SOC) of the photovoltaic generator and the energy store; and predetermining setpoint values for respective powers (P_PV, P_Batt) to be exchanged.

16. The method as claimed in claim 1, further comprising: exchanging current operating data (P_MPP, SOC) of the photovoltaic generator and the energy store between the photovoltaic generator and the energy store.

17. The method as claimed in claim 1, wherein the energy generation system has at least two energy stores, further comprising:
providing, via the photovoltaic generator and a first energy store, balancing power for primary control of the AC voltage grid; and
providing, via a second energy store, balancing power for instantaneous control of the AC voltage grid.

18. The method as claimed in claim 17, further comprising:
exchanging, via the second energy store, an instantaneous balancing power (P_Moment) with the AC voltage grid via a voltage-impressing inverter.

19. An energy generation system for providing balancing power for an AC voltage grid with a photovoltaic generator, comprising:
an energy store; and
a control unit, wherein the control unit is configured to operate the energy generation system by:
exchanging a total power (P_Netz) with the AC voltage grid, wherein the total power (P_Netz) exchanged is set as a function of a current maximum PV power (P_MPP), a basic PV power (P_PV_0) that is predefined between zero and the current maximum PV power (P_MPP), and a provided or requested balancing power;
when no balancing power is requested: feeding in a total basic power (P_Netz_0), which comprises the basic PV power (P_PV_0);
when a negative balancing power is requested: reducing a PV power (P_PV) compared to the basic PV power (P_PV_0); and
when a positive balancing power is requested: drawing a battery power (P_Batt) from the energy store in response to the provided or requested positive balancing power being greater than a difference between the current maximum PV power (P_MPP) and the basic PV power (P_PV_0),
wherein the basic PV power (P_PV_0) is lower than the current maximum PV power (P_MPP), and
wherein the PV power (P_PV) is increased compared to the basic PV power (P_PV_0) when the positive balancing power is requested.

20. The energy generation system as claimed in claim 19, wherein the photovoltaic generator and the energy store are connected to the AC voltage grid via a common grid connection point.

21. The energy generation system as claimed in claim 20, wherein a plurality of photovoltaic generators and/or a plurality of energy stores are connected to the common grid connection point via a common bidirectional inverter, wherein the common bidirectional inverter is connected to the plurality of photovoltaic generators or the plurality of energy stores via individual direct current converters.

22. The energy generation system as claimed in claim 19, wherein the control unit is communicatively connected via an indirect connection via a network to the photovoltaic generator and the energy store, wherein the photovoltaic generator and the energy store are connected to the AC voltage grid via different, physically separated grid connection points.

23. The energy generation system as claimed in claim 19, further comprises a plurality of energy stores of different designs, wherein at least one of the plurality of energy stores comprises a lithium-ion accumulator and at least one other of the plurality of energy stores comprises a supercapacitor.

* * * * *